United States Patent Office 3,420,319
Patented Jan. 7, 1969

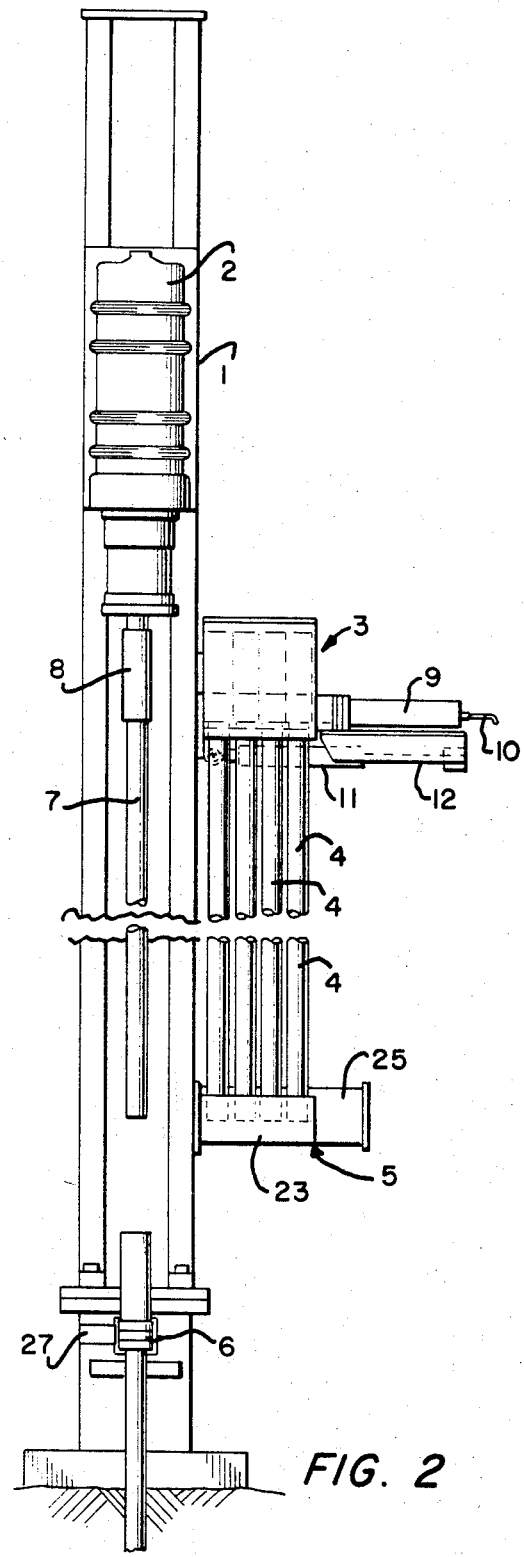
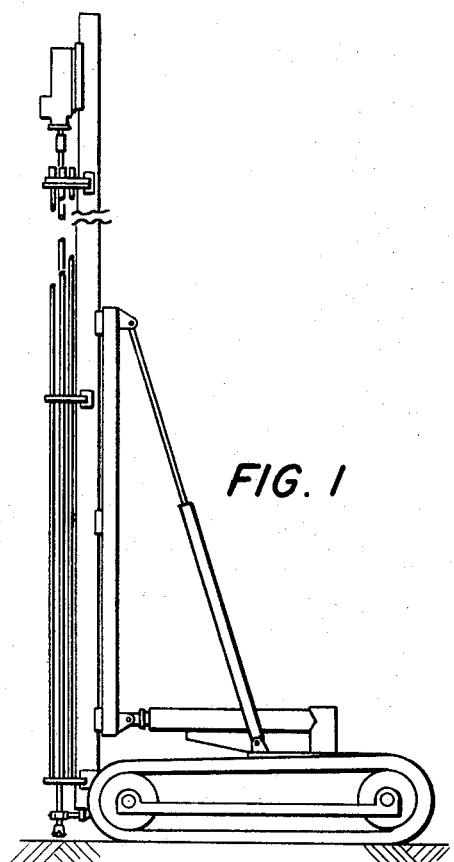
FIG. 1
FIG. 2
INVENTORS
PAUL A. LINCOLN
SAMUEL LEVEN
BY
AGENT

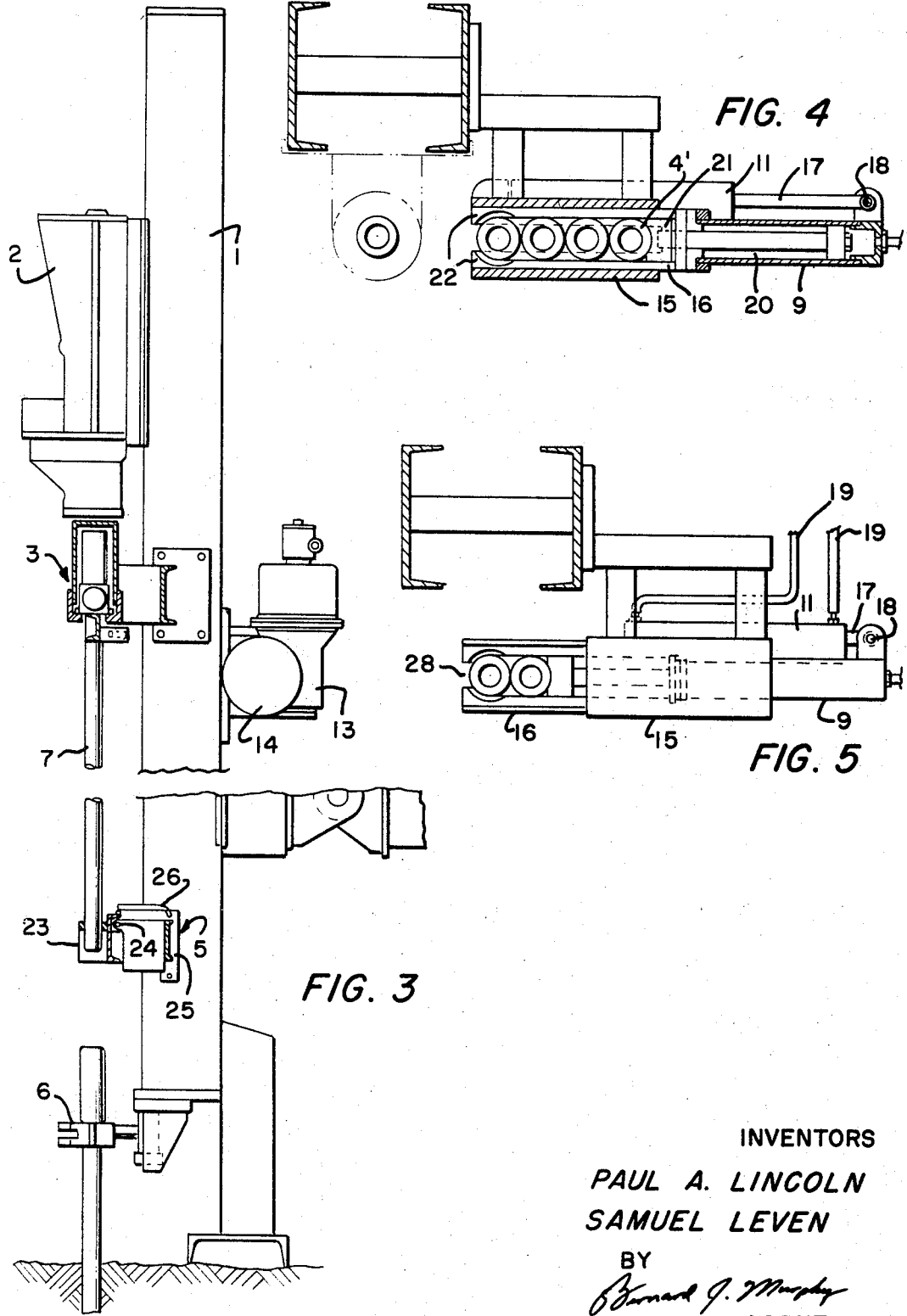

3,420,319
DRILL STEEL HANDLING APPARATUS
Paul A. Lincoln, Bloomsbury, N.J., and Samuel Leven,
Easton, Pa., assignors to Ingersoll-Rand Company, New
York, N.Y., a corporation of New Jersey
Filed Apr. 14, 1967, Ser. No. 630,970
U.S. Cl. 175—52                                10 Claims
Int. Cl. E21b 19/14

ABSTRACT OF THE DISCLOSURE

An extension drill steel changing and storage apparatus mounted on the side of a drilling machine; the apparatus has a drill steel storage magazine which is laterally displaced by a power device to align a foremost drill steel with the drilling machine for coupling thereto.

This invention relates to extension drill steel handling apparatus and in particular to an improved drill steel changing and storage apparatus for use with a drilling machine.

Prior art drill steel storage and handling devices have involved the use of a hoist with an attached handling tool to elevate and lower drill steels for attachment to a drilling machine. These are awkward in use, time consuming, and somewhat jeopardize the person of the operator in that the drill steel needs to be handled manually to align a coupling end thereof with the drilling machine. Other prior art arrangements teach the use of "lazy susan" types of storage arrangements which rotate a radial array of stored drill steels for coupling of successive ones to the drilling machine. However, these too require the operator to manually couple each steel, by means of a wrench or some other handling tool, to the chuck end of the drilling machine. These known arrangements require manual operations at what may be an elevation of 20 or 30 feet from ground level. Further, most of these prior devices cannot be transported, halted, and elevated with the steels all the while held in storage emplacement ready for handling and use. Usually the known devices must first be moved to the work area, elevated, and then charged with a supply of drill steels, or supplied and then elevated (at the work area).

Some other drill steel storage and handling arrangements have very complex mechanisms involving a plurality of hydraulic and pneumatic devices, motors, and the like to remove a drill steel from storage and align it with the drilling machine and subsequently to remove it therefrom and place it in storage. Accordingly it is an object of this invention to provide an improved extension drill steel handling apparatus which obviates the necessity for manual handling of the extension-drill steel at the elevated end of the structure. It is a further object of this invention to provide a safer, simpler, powered drill steel changing and storage apparatus which requires the selective operation of but a single power device to couple the coupling end of the drill steel to the drilling machine. Another object of this invention is to provide a drill steel changing and storage apparatus which can be charged at a station remote from the work area, transported without having the stored extension drill steels rattle or vibrate out of storage, and elevated at the work area in place and ready for powered coupling of the drill steels to the drilling machine.

A feature of this invention comprises the use of a magazine and a rack for storage of the drill steel which magazine and rack are mounted to the drilling machine structure. Another feature of this invention teaches the cooperative use of holding surfaces formed in the magazine and an air cylinder and piston to hold the foremost drill steel against turning so as to accommodate its coupling to the drilling machine.

The above mentioned and other features and objects of this invention will become more apparent by reference to the following description taken in conjunction with the accompanying drawings, in which:

FIGURE 1 is a side view of prior art drill steel changing storage apparatus mounted with a drilling machine on a crawler type vehicle;

FIGURE 2 is an elevational plan view of the drill steel changing and storage apparatus, according to the invention, mounted with a drilling machine;

FIGURE 3 is a side view of the invention shown in elevation with the novel storage magazine holder and rack shown partly in section;

FIGURE 4 is an end view of the magazine holder in cross-section and with the magazine in a retracted position; and FIGURE 5 is an end view of the magazine in an extended position.

FIGURE 2 shows the guide 1 with the drilling machine 2 mounted thereon with a magazine holder 3, according to the invention, shown mounted to the side of the guide. A plurality of drill steels 4 are positioned in the magazine holder, and the rack 5, which receives the lower end of the plurality of steels, is seen at the lower end of the guide. A centralizer 6 is coupled to the lower end of the guide for straight axial alignment of the steels. A steel 7 is shown with a coupling end 8 secured to the drilling machine. An air cylinder 9 is mounted to a magazine holder 3 for movement therewith. An air line 10 is connected to the air cylinder to power the latter so as to keep the stored steels urged toward the guide. A hydraulic cylinder 11 shown fixed to the guide, with the movable member 12 thereof coupled to the air cylinder, effects the desired movement of the steels and air cylinder. In FIGURE 3 is shown the feed motor 13 which has a pulley 14 which, through a chain (not shown), moves the drilling machine along the guide. In FIGURES 4 and 5 the magazine holder 3 and components thereof are shown in more detail as comprising the cover 15 partially enclosing the magazine 16. A hydraulic piston rod 17 is shown connected to the air cylinder 9 at 18, and hydraulic lines 19 are shown coupled to cylinder 11. An air piston and rod 20 is shown with the follower end 21 aligned against the outer steel 4' in the magazine. Finally, holding surfaces 22 can be seen formed on that end of the magazine 16 which is proximate to the guide 1.

FIGURE 3 shows the rack 5 in cross-section mounted on the guide 1. The rack has a tray 23, for storage of the drill steels, which is slidable on pin 24 secured in the fixed structure 25. A locking handle 26 secures the tray in a retracted position, i.e., in a position removed from the centerline of the guide 1, for secure holding of the tray 23, and the drill steels, during transport. By releasing the handle 26, the tray 23 is free to slide on pin 24—by manual means, or by the pendulum action of the above-held drill steels—for alignment of a foremost drill steel with the drilling machine 2.

FIGURES 2 and 3 show the centralizer 6, of conventional design known to those skilled in the art, having a hand grip 27 used for the opening and closure thereof. The operation of the apparatus is detailed in the following paragraphs.

At the outset, air pressure is removed from the air cylinder 9 and the magazine 16 is extended for the reception of steels 4 for storage. This is done by actuation of the hydraulic means 11, 12. Remote controls, not shown but well known in the art, are used for these operations. The steels are initially inserted into the magazine 16 and rack 5 for storage by manual means, with the apparatus in a horizontal position. After full storage, the air pressure is returned to the air cylinder 9 and the magazine 16 is retracted. The drilling machine 2 and the novel apparatus can then be transported to the work area and elevated. The drilling machine is raised on the guide 1 by means of feed motor 13. The magazine 16 is extended by the hydraulic means 11, 12, and rack 5 is manually moved over the guide 1, to align a foremost steel with the chuck end of the drilling machine 2. The drilling machine is powered, and then it is lowered by feed motor 13, causing the chuck end thereof to turn into the coupling end 8 of the steel 7. Holding surfaces 22 of magazine 16 act as a wrench and, under the pressure of air cylinder 9 and the urging of piston and rod 20, hold fast the coupling end of the foremost steel. Next the feed motor 13 is actuated to raise the drilling machine 2 and to lift the coupled steel 7 partially out of the magazine 16 and wholly out of rack 5. Then the magazine 16 and rack 5 are retracted so the drilling machine 2 can be lowered down the guide 1. When the magazine is retracted, the shank portion of the coupled drill steel freely passes through the portal access 28 formed in the end thereof. It is necessary for an operator to manually align the bottom or ground level end of the drill steel 7 within the centralizer 6.

The centralizer 6 has a circular aperture which corresponds to the outside diameter of the shank portion of the drill steel 7. Thus, as the couplings 8 of successively joined steels approach the centralizer 6, an operator must use hand grip 27 to open the centralizer to allow the couplings 8 to pass through.

In joining a second extension drill steel to first extension drill steel the following simple operation is pursued:

A first drill steel is addressed to the work area to be drilled until the coupling 8 thereof has reached the top of the centralizer 6. The drilling machine 2 is reversed in its rotation as the first drill steel is manually held against rotation by means of a wrench or a similar tool. The drilling machine, being disengaged from the first drill steel, is then elevated on the guide 1 and coupled to a second drill steel in the manner previously described. When the second drill steel is coupled to the drilling machine 2, both are lowered to the first drill steel coupling 8. The first drill steel is again held against rotation and the second drill steel is rotated and couplingly turned into the coupling 8 of the first drill steel. The two drill steels being coupled together, an operator opens the centralizer 6 to pass the coupling 8 down through. After operations have moved the coupling 8 below and beyond the centralizer, the centralizer is again closed.

In reverse operation a first drill steel 7 is removed from a line of coupled drill steels as follows: the drilling machine 2 is elevated until the coupling 8 of the drill steel which is second in line out from the drilling machine is just above the centralizer 6. As previously explained, the centralizer had to be opened to pass the coupling 8 through and then closed again. The drilling machine 2 is put in reverse direction while the coupling 8 of the second drill steel is held fast, by means of a wrench, to uncouple the first and second drill steels. Next, air pressure is removed from the air cylinder 9 of the retracted magazine 16, and the drilling machine 2, now with only the first drill steel 7 coupled thereto, is elevated on the guide 1. The second and succeeding drill steels are prevented from falling into the drilled hole by the coupling 8 of the second drill steel being disposed above the closed centralizer. Thusly is the rest of the drill steel chain suspended. The magazine 16 is extended to allow the drill steel 7 to pass therein with the coupling 8 thereof just above the holding surfaces 22. The rack 5 is slid over onto the guide 1 in axial alignment with the drill steel 7. The drilling machine 2 is lowered to place the coupling 8 against the holding surfaces 22 and the lower end of the drill steel in the rack 5. Air pressure is returned to the air cylinder 9 to hold the coupling 8 against turning, and the drilling machine 2 is put in reverse rotation to uncouple the drill steel 7. Finally, the drilling machine is elevated on the guide 1, and the magazine 16 and rack 5, with the first drill steel stored therein, are both retracted. This procedure is repeated for each drill steel in the drill steel chain.

While we have described above the principles of our invention, it is to be clearly understood that this description is given only by way of example and not as a limitation to the scope of our invention as set forth in the objects thereof and in the accompanying claims.

We claim:

1. In combination with a drilling machine, an extention drill steel changer and storage apparatus, comprising:
   an extended guide;
   driving means for said drill steels coupled to said guide;
   a magazine, for the abreast storage of a plurality of said drill steels, displaceably coupled to said guide;
   power means, coupled to said guide and said magazine, for the displacement of said magazine; and
   means carried by said guide, for moving said driving means on said guide.

2. The invention, according to claim 1, wherein said power means comprise means operative for displacing said magazine on a line transverse to the axis of said guide.

3. The invention, according to claim 1, wherein said magazine comprises means for urging drill steels stored therein toward said guide.

4. The invention, according to claim 3, wherein said power means comprise means cooperative with said urging means to align a foremost drill steel in said magazine centrally of said guide and said drive means.

5. The invention, according to claim 3, wherein said magazine comprises holding means coopertive with said urging means to restrain all said drill steels in said magazine and to brake a foremost drill steel in said magazine against rotation.

6. The invention, according to claim 5, wherein said holding means, urging means, and said moving means are cooperative with said driving means to couple the latter with said foremost drill steel.

7. The invention, according to claim 1, further comprising a rack coupled to, and disposed laterally of said guide which cooperates with said magazine to store said drill steels.

8. The invention, according to claim 7, wherein said magazine has an enlarged access portal formed therein for the passage of said drill steels therethrough.

9. The invention, according to claim 8, wherein said moving means cooperates with said portal to effect the passage of said drill steels through said portal, wherein a foremost drill steel can be extracted from said magazine and said rack for coupling thereof to said driving means, and can be repositioned in said magazine and said rack for storage.

10. The invention, according to claim 1, wherein:
   said magazine is disposed laterally of said guide; and
   said power means comprise a single power cylinder.

References Cited

UNITED STATES PATENTS

| | | | |
|---|---|---|---|
| 2,527,255 | 10/1950 | Hunt | 175—52 |
| 2,848,196 | 8/1958 | Simmonds | 175—52 |
| 3,025,918 | 3/1962 | Leven | 175—52 |
| 3,286,777 | 11/1966 | Gyongyosi | 175—52 |
| 3,336,991 | 8/1967 | Klem | 175—85 |

NILE C. BYERS, JR., *Primary Examiner.*